March 3, 1936.    J. E. BURNS    2,032,562
CITROUS FRUIT TOOL
Filed Jan. 25, 1932    3 Sheets-Sheet 1
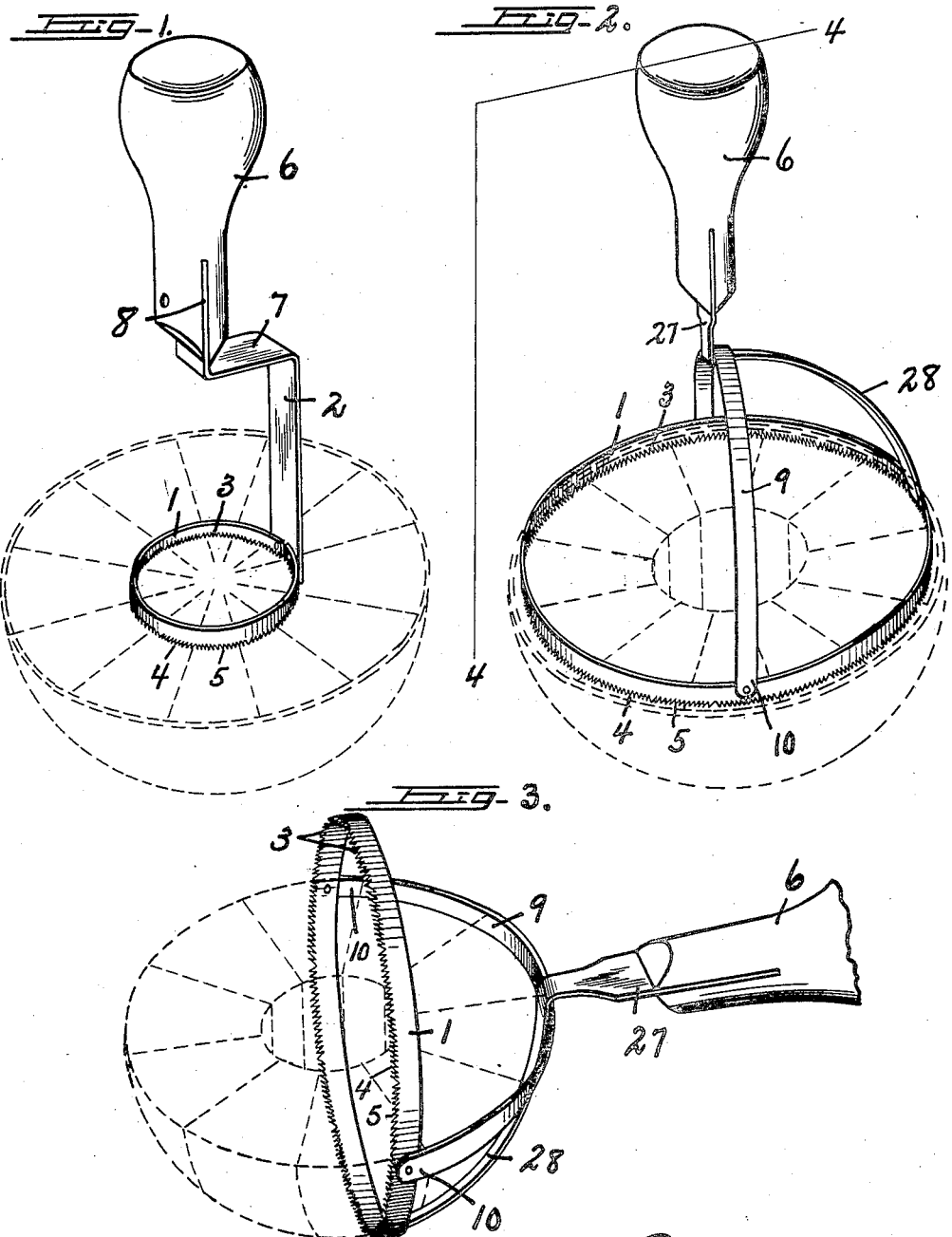

March 3, 1936.  J. E. BURNS  2,032,562
CITROUS FRUIT TOOL
Filed Jan. 25, 1932  3 Sheets-Sheet 2
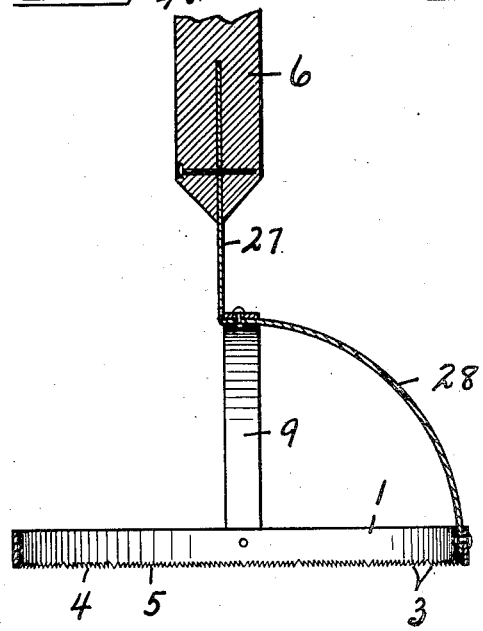
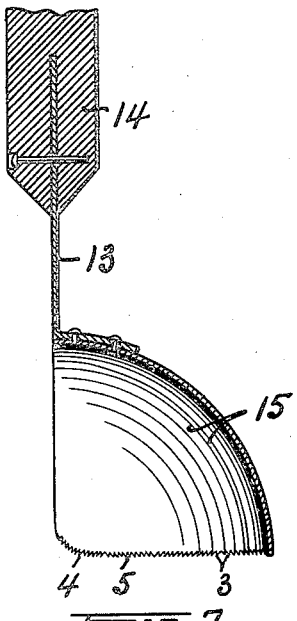
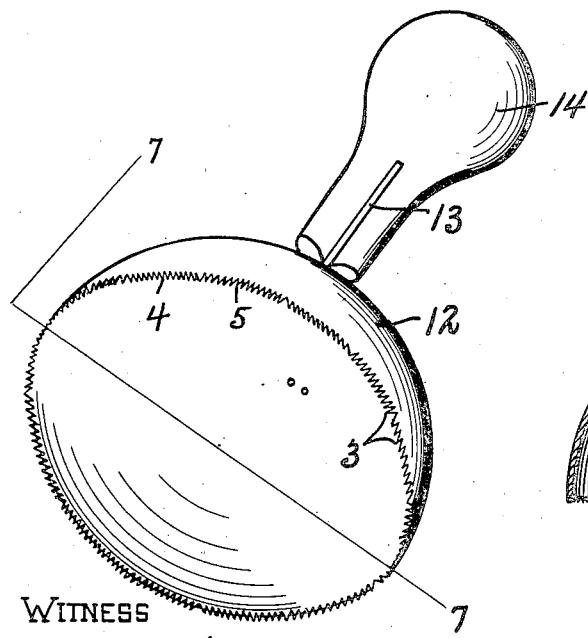
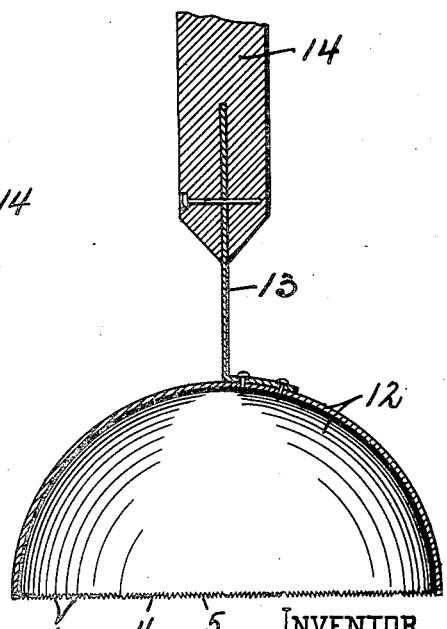

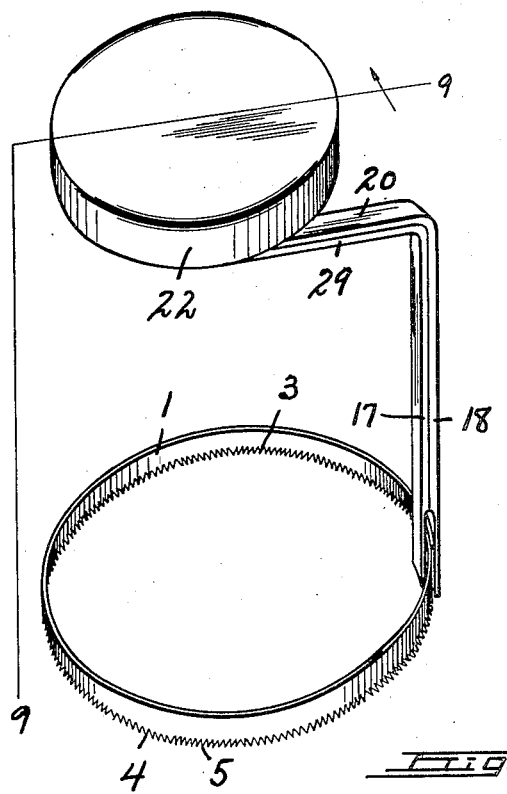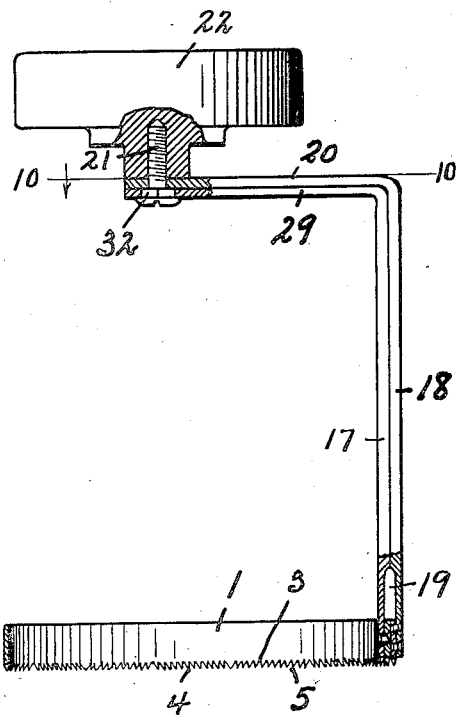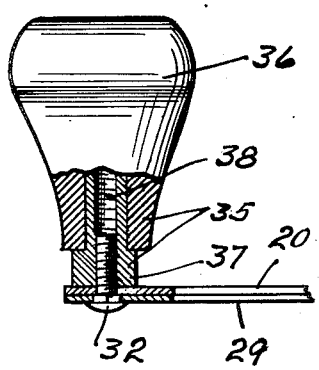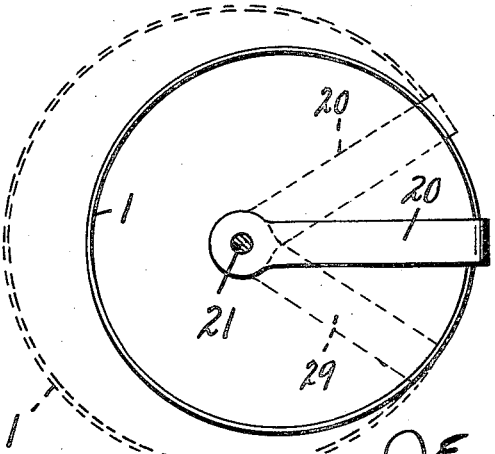

Patented Mar. 3, 1936

2,032,562

UNITED STATES PATENT OFFICE 2,032,562

CITROUS FRUIT TOOL

Joseph E. Burns, Syracuse, N. Y.

Application January 25, 1932, Serial No. 588,677

5 Claims. (Cl. 146—3)

This invention relates to certain new and useful improvements in citrous fruit tools.

Heretofore, considerable difficulty and personal annoyance has been experienced in separating the juice-containing portions of articles such as citrous fruit including grape fruit, oranges, lemons and perhaps other articles from the inclosing casing or peel and the spacing webs radially dividing the interior of the article, and the main object of the present invention is the production of a cutting tool for effectively and rapidly separating the interior juice-containing portion of various articles such as grape fruit, oranges and lemons from the inclosing casing and the interior separating webs and for readily and easily removing the core or center portion of such citrous fruit so that an annulus consisting essentially of the juice-containing portions of the article is rendered readily available for eating or other purposes.

A further object resides in the provision of such a cutting tool that is adjustable for use in connection with articles of fruit of different sizes.

Other objects and advantages will appear from the following description taken in connection with the accompanying drawings in which:—

Figure 1 is a perspective view of a cutting tool for removing the core or central portion of an article such as a citrous fruit.

Figure 2 is a perspective view of a cutting tool for separating the interior or juice-containing portion of an article such as citrous fruit from the exterior casing or peel.

Figure 3 is a perspective view of the device of Figure 2 illustrating the method of utilizing the tool.

Figure 4 is a section on line 4—4, Figure 2.

Figure 5 is a perspective view of a modified form of tool.

Figure 6 is a section taken on line 6—6, Figure 5.

Figure 7 is a section similar to Figure 4 of a modified form of tool.

Figure 8 is a perspective view of a modified and adjustable tool.

Figure 9 is a section taken on line 9—9 of Figure 8.

Figure 10 is a section on line 10—10, Figure 9.

Figure 11 is a detail face view partly in section illustrating a modified form of handle.

The tool used for removing the central portion of the fruit and the tool used for separating the interior of the fruit from the peel are generally similar in construction and embody the same generic idea.

The tool shown in Figure 1 comprises a substantially circular narrow thin strip of steel 1 having its end portions secured to the lower end of handle bar 2 as by means of rivets or the like. The ends of the strip 1 being arranged in proximity and being secured to the handle bar 2 permanently retain the strip 1 in its circular form. Preferably, the strip 1 before its securement to the handle bar 2 is a straight narrow thin strip of steel and the edge which is adapted to constitute the cutting edge is provided with a multiplicity of fine accurately shaped teeth 3 formed by grinding, pressing or cutting alternate grooves and ridges in one side of the blade intersecting and breaking the continuity of the edge of the blade to form teeth.

The serrated cutting edge described is preferably produced by the process described in Letters-Patent of the United States No. 1,435,514 issued to me under date of November 14, 1922, and the edge is preferably formed with a number of sets of serrations, the serrations of one set as 4 being inclined in one direction, and the serrations of another set as 5 preferably the adjacent one, being inclined in the opposite direction, all as described and claimed in Letters-Patent of the United States issued to me under date of August 23, 1921, No. 1,388,547.

However, the inclinations of the sets of serrations may vary and it is possible to provide intervening sets which are ground at right angles to the length of the blade. When the blade has been provided with the sets of serrations described, it may then be bent into circular form with its ends positioned adjacent each other and the ends are then secured to the handle bar 2. Preferably in order that handle 6 may lie in substantially the axis of the annular cutting blade 3, handle bar 2 is provided with a laterally flanged portion 7 terminating in a vertically flanged portion 8 to which handle 6 is secured in any suitable manner.

Rotating the cutting tool 1 by turning handle 6 preferably first in one direction and then in the other in view of the opposite inclination of the sets of serrations, will cause the tool to readily cut out the central portion of the citrous fruit illustrated in dotted lines, Figures 1, 2, and 3 as cut in half. Tilting of the cutting blade through the medium of the handle will cut the central portion of the fruit from the peel permitting its ready removal by withdrawing the tool 1 from its inclined or tilted position.

In Figures 2, 3, and 4, a cutting blade 1 is provided of exactly the same form as blade 1 illustrated in Figure 1 and provided with the same multiplicity of teeth arranged in sets of serrations with adjacent sets preferably inclined in opposite directions. However, the tool of Figures 2 and 3 is designed for separating the juice-containing interior of the fruit from the peel and for that reason, the knife is considerably larger in diameter and the means for supporting and rotating the knife varies somewhat.

A strip 9 preferably of bendable metal has its opposite ends 10 and 11 secured to cutting tool 1 at diameteric points as, for instance, by riveting, spot welding or the like, and preferably strip 9 is bowed on a radius substantially the same as the radius of the cutting tool 1 or considerable variation in this respect is possible and other forms may be used.

Handle 6 is connected to a flange 27 upon a second strip 28 which extends underneath and is secured to the strip 9 as by welding, riveting or the like, and has its outer end connected to cutting tool 1 at a point midway between the ends 10 and 11 of strip 9. Strip 28 is preferably bent on a radius substantially the same as the radius of the cutting tool 1 forming a substantially hemispherical frame so that when the cutting tool is tilted or turned to a horizontal axis, strip 28 will guide the cutting tool within the peel of the fruit with which its radius of curvature corresponds.

The cutting tool 1 may be formed in like manner in all cases and, as illustrated in Figures 2 and 3, its end portions when the strip has been bent into circular form, are secured to the lower end of strip 28 in any suitable manner as by spot welding, riveting or the like.

The cutting tool, as illustrated, is designed to be of the right diameter to fit either a grape fruit, an orange, a lemon, etc., and for different articles, different diameters of the cutting tool 1 are provided without varying in any way the construction of the device.

When the juice-containing portion of the fruit has been cut from the peel around the upper edge of the latter by first turning handle 6 in opposite directions with the tool in the position shown in Figure 2, the cutting tool is then tilted while oscillation is continued and the fruit turned as by hand until the juice-containing portion has been cleanly separated from the peel throughout its entire surface.

It will be apparent when the tool is in the position shown in Figure 3, that the cut away interior portion will rest upon the strip 8 and be maintained thereon by the strip 9 so that the interior cut away portion can be removed by the use of the tool without manual contact with the cutaway portion.

In Figure 6, a modified form of device is illustrated in that a hemi-spherical steel shell 12 is provided, the entire edge of which is formed with serrations in like manner as the cutting tool. These serrations in all cases are preferably uniformly shaped accurately ground fine teeth produced as described in patents before referred to.

A handle bar 13 has its lower end flanged and is secured by riveting, spot welding or the like to the closed end of shell 12 so as to extend upwardly at substantially the axis of the shell, and handle 14 is secured to its upper end in any suitable manner.

In Figure 5, a further modified form of device is shown in that instead of the hemi-spherical shell shown in Figure 6, approximately one-half of such a shell is utilized as illustrated at 15 so that the serrated or cutting edge 3 extends throughout substantially a semi-circumference. Otherwise, the construction is the same.

It will be apparent that with the construction of Figures 5, 6, and 7, the shell acts as a container for the interior of the fruit when it has been cut away from the peel, but is however merely a complete container as distinguished from the partial container formed by the strips 8 and 9 of Figures 2 and 4 inclusive.

In Figures 8, 9, and 10, a modified form of device is illustrated and which is adjustable for use in connection with articles of varying size. The blade 1 is of the same form, construction and serrated edge as the blade 1 of the previous figures, but in this arrangement the free ends of blade 1 are connected respectively to the adjacent grooved sides of two bars 17 and 18, which bars can be brought into overlying relation as shown in full lines in the figures, in which position the ends of the cutting bar 1 overlap between the surfaces of the bars 17 and 18 within the recess 19. The bars 17 and 18 are flanged laterally towards the axis of the cutting bar 1 at a point some distance above the bar 1 forming laterally overlying flanges 29 and 20.

The flanges 29 and 20 near their inner ends are formed with registering openings for the passage of screw 21 upon which handle or knob 22 is threaded so that by loosening knob 22, the outer bar 18 may be swung in either direction about the screw to cause the ends of cutter bar 1 to further overlap and reduce the diameter of said bar to suit the requirements of a particular article, or can be swung in the opposite direction to separate the ends of the cutter bar 1 and increase its diameter. When a desired position of the two bars 17 and 18 has been obtained for the required article, knob 22 is threaded down to grip the ends of flanges 29 and 20 and maintain the pre-determined position. Preferably either or both or one of the adjacent surfaces on bar 17 and/or 18 are roughened so as to increase their gripping action under pressure applied by the threading of knob 22 on screw 21.

In order to prevent relative swinging movement of bar 17 with respect to screw 21, the opening in the bar is preferably of angular form, and the screw 21 has a corresponding angular portion 32. With this construction of device, it is possible to adjust the diameter of the cutting bar 21 within reasonable limits to suit articles of varying sizes.

In Figure 11 is illustrated a modified form of handle adapted to be substituted for the handle or knob 22 shown in connection with the device illustrated in Figures 8, 9, and 10. This handle as 35 consists of an inverted pear-shaped member 36 composed of wood, hard rubber or the like and a shank member 37 composed of metal secured coaxially in the member 36 to rotate therewith, and which is provided with an internally threaded opening 38 adapted to receive the screw 21 in the same manner and for the same purpose described for the knob 22.

Although I have shown and described specific constructions of devices as constituting embodiments of the invention, I do not desire to restrict myself to the details of form, construction or arrangement, as various modifications and changes can be made within the scope of the appended claims.

I claim:—

1. In a citrous fruit tool, a thin steel strip bent in the form of a circular blade and having its edge provided with a multiplicity of fine serrations, separate bars secured to the opposite ends of the blade, and means secured to at least one of said bars for maintaining said bars in various positions of adjustments relative to each other to pre-determine the diameter of the strip.

2. In a citrous fruit tool, a thin steel strip bent in the form of a circular blade and having its edge provided with a multiplicity of fine serrations, separate bars secured to the opposite ends of the blade, and having overlying portions, means engaging the overlying portions of the bars to maintain them in predetermined positions.

3. In a citrous fruit tool, a thin steel strip bent in substantially circular form and having its edge provided with a multiplicity of serrations, curved bars secured to said strip and extending away from the strip and having a radius of curvature substantially equal in length to the radius of said curved strip so that the entire structure outlines a section of a sphere.

4. In a manually operable citrous fruit tool, a thin narrow strip of metal bent in an arcuate form and having a plurality of sets of fine serrations forming a cutting edge, certain of said sets of serrations extending in one direction and others of said sets extending in the opposite direction, an arcuate metal bar struck on substantially the same radius as the metal strip forming the cutting edge and having its ends secured thereto, and a manually operable handle operatively connected to said metal bar.

5. In a device for removing the rind from citrous fruit, a narrow thin steel strip blade in substantially circular form and having a cutting edge with a plurality of sets of fine serrations, certain of said sets extending in a different direction from the other sets so that when the blade is oscillated it serves to cut fruit in each direction of rotation, an arcuate bar bridging the blade, a second bar having one end secured to the blade and its other end intersecting the bridging bar substantially at its midpoint to act as a guide during the cutting of the fruit, and a handle for manually oscillating said device.

JOSEPH E. BURNS.